Nov. 12, 1957     D. A. FLUEGEL ET AL     2,813,237
FLOW MEASURING SERVOSYSTEM

Filed July 16, 1953     2 Sheets-Sheet 1

INVENTORS
D. A. FLUEGEL
D. E. LUPFER
BY Hudson & Young
ATTORNEYS

Nov. 12, 1957 D. A. FLUEGEL ET AL 2,813,237
FLOW MEASURING SERVOSYSTEM
Filed July 16, 1953 2 Sheets-Sheet 2

INVENTORS
D. A. FLUEGEL
D. E. LUPFER
BY Hudson & Young
ATTORNEYS

United States Patent Office 2,813,237
Patented Nov. 12, 1957

2,813,237

FLOW MEASURING SERVOSYSTEM

Dale A. Fluegel and Dale E. Lupfer, Bartlesville, Okla., assignors to Phillips Petroleum Company, a corporation of Delaware Application July 16, 1953, Serial No. 368,266

13 Claims. (Cl. 318—29)

This invention relates to flowmeters. In one specific aspect it relates to a thermal flowmeter adapted to measure the rate of liquid flow.

In various fields of industry there is a need for flow measuring apparatus which is capable of indicating rates of flow with a high degree of accuracy. Furthermore, it generally is desirable that such apparatus be capable of providing an output signal which can actuate suitable control mechanism to maintain a predetermined condition in the process under control in response to the measured flow rate. The present invention is directed primarily toward providing such apparatus.

Accordingly, it is an object of this invention to provide apparatus capable of measuring fluid flow with a high degree of accuracy.

Another object is to provide flow measuring apparatus capable of actuating control mechanism in response to the measured flow rate.

A further object is to provide an improved thermal type flowmeter wherein the fluid under measurement is subjected to a predetermined quantity of heat and the resulting temperature of the fluid is measured at a point downstream from the region of heat addition.

A further object is to provide improved electrical circuitry for use with flowmeters of the above-mentioned type.

The apparatus of the present invention comprises generally a flow cell through which the fluid under measurement is directed, this cell being provided with an electrical heating element to supply a predetermined quantity of heat to the flowing fluid. A first temperature sensitive resistance element, hereinafter referred to as a thermistor, is positioned in the flow path downstream from the region of heat addition and a second thermistor is positioned in the flow path upstream from the region of heat addition. The two thermistors are connected in an electrical bridge circuit which provides an indication of the temperature differential therebetween. The temperature of the flowing fluid in the region of the first thermistor is a function of the rate of flow, whereby measurement of the temperature of the fluid at this region provides an indication of the flow rate. The second thermistor is utilized as a means of compensating the apparatus for changes in ambient temperature of the fluid under measurement and provides a reference for measurement of the temperature difference. The flow cell is provided with an insulated jacket to increase the efficiency of heat transfer to the fluid and to minimize heat loss from the cell to reduce further the effects of ambient temperature change. The output signal from the bridge circuit is recorded to provide a continuous measurement of the rate of flow; this output signal can also be utilized to actuate suitable control mechanism if desired.

Various other objects, advantages and features of this invention should become apparent from the following detailed description taken in conjunction with the accompanying drawing in which.

Figure 1:
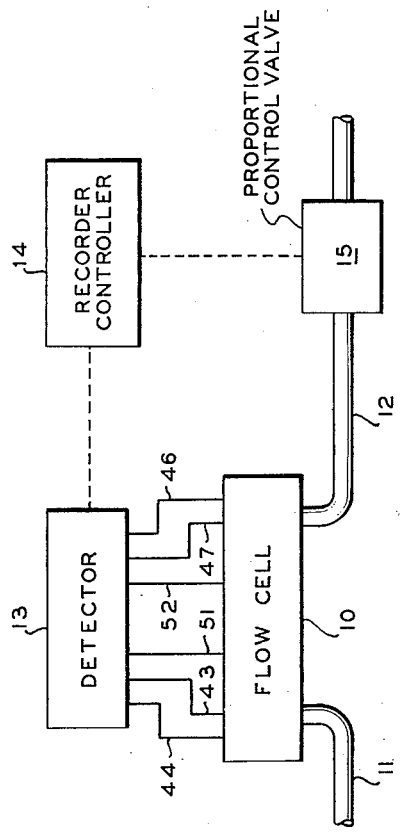
Figure 1 is a diagrammatic view of the flow measuring apparatus of this invention together with electrical recording and control mechanism associated therewith.

Referring now to the drawing in detail and to Figure 1 in particular there is shown a flow cell 10 having an inlet conduit 11 and an outlet conduit 12 connected thereto. The fluid under measurement enters the flow cell through conduit 11 and leaves through conduit 12. A detector circuit 13 is connected to flow cell 10 and provides an output signal representative of the rate of flow through cell 10. This output signal from detector 13 is applied to a recorder-controller 14 which provides both a continuous record of the flow rate through cell 10 and an output signal which can adjust a proportional control valve 15, for example, which is positioned in conduit 12. In this manner a constant predetermined flow rate through cell 10 can be maintained.

Figure 2:
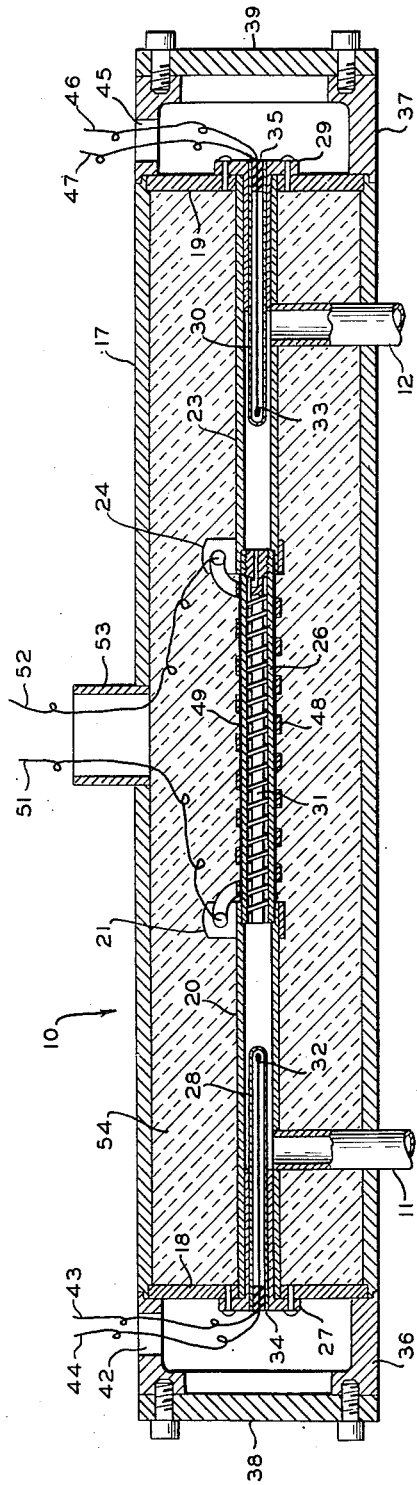
Figure 2 is a detailed view, shown partially in section, of a first embodiment of the flow cell.

Flow cell 10 is illustrated in detail in Figure 2. This cell assembly comprises an elongated hollow cylindrical shell 17 having plates 18 and 19 positioned across the respective ends thereof. A first conduit 20 is attached at one end to plate 18 and extends therefrom into the interior of shell 17 along the longitudinal axis thereof. Conduit 20 is supported at its second end by a bracket 21 which is attached to shell 17. A second conduit 23 is attached in like manner to plate 19 so as to extend into shell 17 along the longitudinal axis thereof. A second bracket 24 supports the second end of tube 23. A third conduit 26 is attached at its two ends to the respective inner ends of conduits 20 and 23 such that conduits 20 and 23 are in communication with one another through conduit 26. A rod 31 having a spiral fin protruding therefrom is fitted into conduit 26. This directs the fluid flowing through conduit 26 in a helical path.

A first annular bracket 27 is mounted externally of shell 17 on plate 18 and extends into the interior of conduit 20 to support a first thermistor well 28 inside conduit 20. A second annular bracket 29 is mounted exterior of shell 17 on plate 19 and extends into the interior of conduit 23 to support a second thermistor well inside conduit 23. Thermistors 32 and 33 are mounted in respective wells 28 and 30 by respective plugs 34 and 35. Annular housings 36 and 37 are attached to the respective ends of shell 17 to enclose respective plates 18 and 19 and caps 38 and 39 are secured across the ends of respective housings 36 and 37. Housing 36 is provided with opening 42 which allows electrical leads 43 and 44 to extend between thermistor 32 and the exterior of the flow cell assembly. Housing 37 is provided with a corresponding opening 45 which allows leads 46 and 47 to extend between thermistor 33 and the exterior of the flow cell assembly. Inlet conduit 11 extends through the wall of shell 17 to communicate with conduit 20 and outlet conduit 12 extends through the wall of shell 17 to communicate with conduit 23. An electrical heating element in the form of a flat metallic strip 48 is spiraled about conduit 26 but insulated therefrom by a thin layer of insulating material 49 which is deposited on the outer surface of conduit 26. A first electrical lead 51 is attached to one end of heater coil 48 and a second electrical lead 52 is attached to the other end of coil 58. These two leads pass to the exterior of the flow cell assembly through a connector 53 attached to the wall of shell 17. The interior of shell 17 is filled with a mass of heat insulating material 54.

Figure 3:
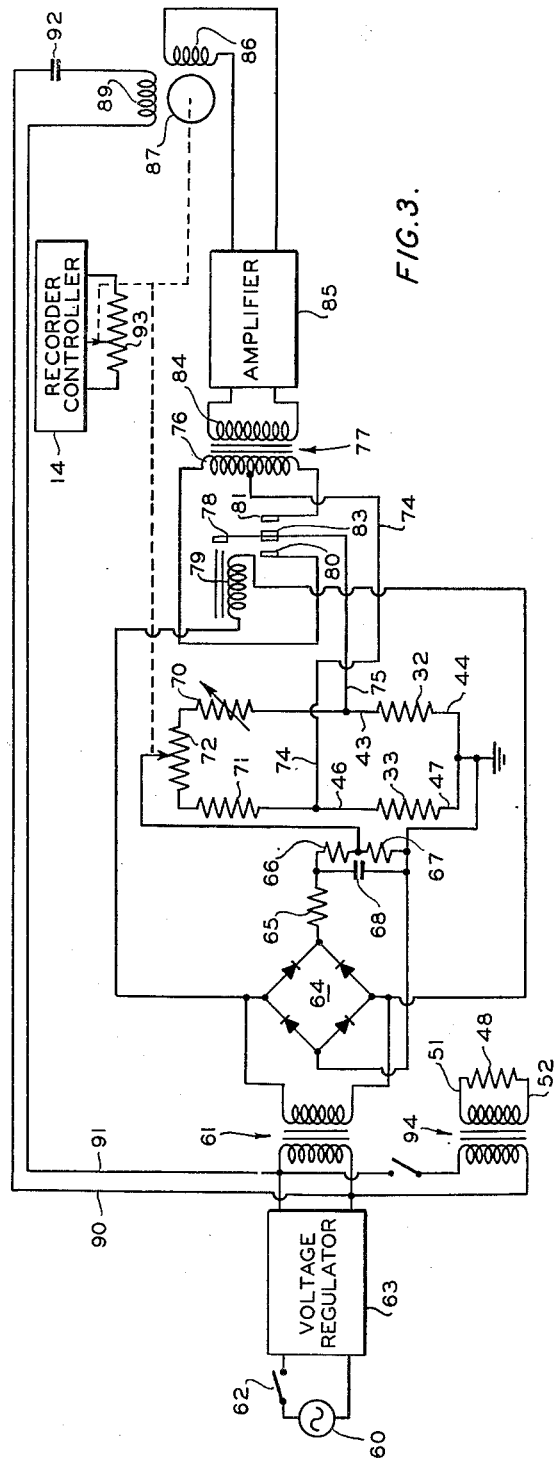
Figure 3 is a circuit diagram of the electrical components associated with the flow cell.

The electrical circuit associated with flow cell assembly 10 is illustrated in Figure 3. A source of alternating potential 60 is applied across the primary winding of a transformer 61 through a switch 62 and a voltage regulator 63. The output terminals of the secondary winding of transformer 61 are applied across a first pair of opposite terminals of a conventional full wave rectifier bridge 64. One of the output terminals of bridge 64 is grounded and the second output terminal thereof is connected to the first end terminal of a resistor 65. The second end terminal of resistor 65 is connected to ground through a pair of series resistors 66 and 67 and a capacitor 68 which is connected in shunt with resistors 65 and 66. Thermistors 32 and 33 are connected in adjacent arms of a modified Wheatstone bridge circuit, the junction between thermistors 32 and 33 being grounded. The second terminal of thermistor 32 is connected to the first terminal of a variable resistor 70 and the second terminal of thermistor 33 is connected to the first terminal of a resistor 71. The second terminals of resistors 70 and 71 are connected to the respective end terminals of a potentiometer 72, the contactor of potentiometer 72 being connected to the junction between resistors 66 and 67. Rectifier bridge 64 thus provides a source of direct voltage which is filtered by resistor 65 and capacitor 68. This direct voltage is applied across the voltage dividing network consisting of resistors 66 and 67. The voltage appearing across resistor 67 is in turn applied across opposite terminals of the modified Wheatstone bridge circuit containing thermistors 32 and 33.

A first output lead 74 of the Wheatstone bridge circuit is connected to the junction between thermistor 33 and resistor 71. A second output lead 75 is connected to the junction between thermistor 32 and resistor 70. Lead 74 is connected to the center tap on the primary winding 76 of a transformer 77 and lead 75 is connected to a vibrating-reed 78 having a small magnet attached thereto. The first end terminal of a coil 79 is connected to one end terminal of the secondary winding of transformer 61 and the second end terminal of coil 79 is connected to the second end terminal of the secondary winding of transformer 61. Reed 78 is provided with a contact 83 which vibrates between and makes contact alternately with contacts 80 and 81. Contact 80 is connected to one end terminal of transformer winding 76 and contact 81 is connected to the second end terminal of transformer winding 76. The end terminals of the secondary winding 84 of transformer 77 are connected to the input terminals of an amplifier 85. The output terminals of amplifier 85 are connected across the first winding 86 of a servo motor 87, the second winding 89 of motor 87 being applied across the output terminals of voltage regulator 63 by leads 90 and 91. A capacitor 92 is connected in line 90 to cause a 90° phase shift. Motor 87 is mechanically coupled to the contactor of potentiometer 72 and to the contactor of a potentiometer 93 which forms a part of recorder-controller 14. As will be described hereinafter in greater detail motor 87 functions to adjust potentiometer 72 to maintain a balanced condition in the Wheatstone bridge circuit. The amount of rotation necessary to provide this balance is recorded by potentiometer 93.

Current for heating strip 48 is provided by a transformer 94. The primary winding of transformer 94 is connected across the output terminals of voltage regulator 63 and the secondary winding of transformer 94 is connected across strip 48 by leads 51 and 52.

In operating the flowmeter of this invention the Wheatstone bridge circuit is balanced initially in the absence of current being supplied to heater strip 48. This is accomplished by adjusting resistor 70 until there is no potential difference between leads 74 and 75. Since thermistors 32 and 33 both are in contact with the flowing fluid the bridge circuit remains in balance despite variations in flow rate. Current then is supplied to heating strip 48. This heats the fluid as it passes in a spiral path past rod 28 such that the fluid leaves outlet conduit 12 at a higher temperature than it enters through inlet conduit 11. Thermistor 33 is therefore at a higher temperature than thermistor 32 and the resulting change in resistance of thermistor 33 tends to cause the Wheatstone bridge to become unbalanced. Under this condition of unbalance a potential difference exists between output leads 74 and 75.

Reed 78 vibrates at the frequency of voltage source 60 such that contact 83 alternately makes contact with contacts 80 and 81. If lead 74 is at a higher potential than lead 75, current flows through the upper half of transformer winding 76 back to lead 75 through contacts 80 and 83 during a portion of one half cycle of vibration of reed 78 and through the lower half of transformer winding 76 back to lead 75 through contacts 81 and 83 during a portion of the second half cycle of vibration of reed 78. The net result of the vibration of reed 78 is that an alternating potential is induced in transformer winding 84 which is amplified and applied to the first control winding 86 of motor 87. This signal causes rotation of motor 87 in a first direction which moves the contactor of potentiometer 72 to restore a balanced condition in the Wheatstone bridge circuit. Once balance is obtained there is no longer a potential difference between leads 74 and 75 and motor 87 remains at rest.

If a decrease in the rate of flow through cell 10 should occur the Wheatstone bridge circuit once again becomes unbalanced such that a potential difference of polarity opposite that previously mentioned is established between leads 74 and 75. This induces a voltage in transformer winding 84 that is 180° out of phase with the previously mentioned voltage. This second voltage rotates motor 87 in an opposite direction by an amount sufficient to restore the Wheatstone bridge circuit to a balanced condition. The vibrating reed assembly is illustrated schematically, it being understood that any of the several known converters can be so employed if desired.

The degree of rotation of motor 87 needed to restore a balanced condition in the Wheatstone bridge circuit is a direct function of the temperature difference between thermistors 33 and 32. This temperature difference in turn is a function of the flow rate through the cell assembly. The rotation of motor 87 is recorded by the potentiometer associated with unit 14 to provide a continuous indication of the flow rate through cell 10. Recorder-controller 14 is a conventional potentiometer-recorder instrument of which several types are available commercially. The output signal from recorder-controller 14, which can be either in the form of an electrical signal or a pneumatic pressure, can be applied to any suitable control instrument to adjust a process variable in response to the measured flow rate. As illustrated in Figure 1 the output signal from recorder-controller 14 is applied to a control valve 15 to maintain a predetermined rate of flow through conduit 12.

The flow cell 10 illustrated in Figure 2 can be constructed of any suitable materials for the particular applications encountered. If the fluid whose flow rate is being measured is corrosive it is necessary that conduits 11, 12, 20, 26 and 23, rod 31, and thermistor wells 28 and 30 be constructed of materials capable of withstanding the corrosive fluid. It is desired that the tips of the thermistor wells 28 and 30, rod 31 and conduit 26 be constructed of a material that is a good heat conductor. These latter elements preferably are constructed of copper if the nature of the fluid under measurement is such that copper can be employed. Thermistors 32 and 33 are selected of materials having high temperature coefficients of resistivity. These thermistors preferably are constructed of metallic oxides which have a high negative temperature coefficient of resistivity. The use of rod 31 having the spiral fins thereon serves to promote efficient heat transfer between heater strip 48 and the fluid passing through conduit 26. The two thermistor wells 28 and 30 are positioned such that the tips thereof are directly in the flow path.

Figure 4:
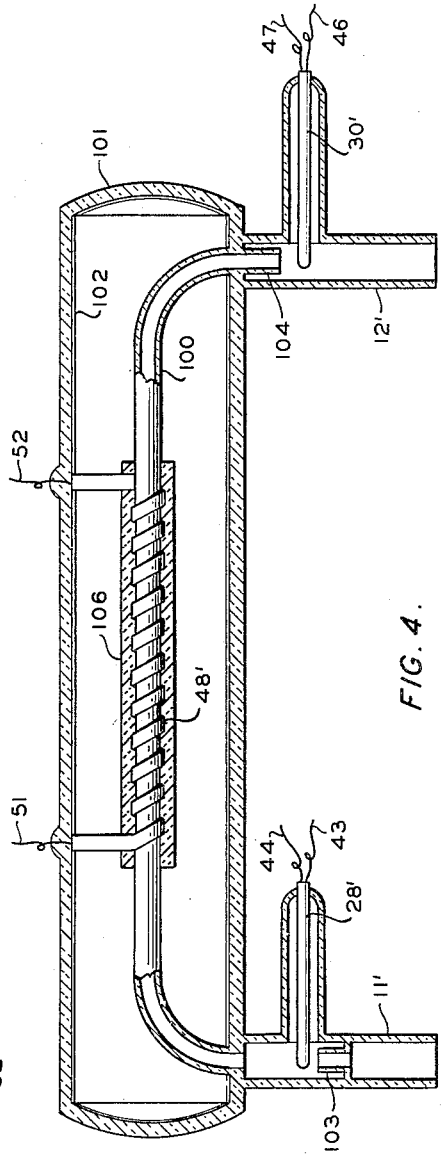
Figure 4 is a detailed view, shown partially in section, of a second embodiment of the flow cell.

In Figure 4 there is illustrated a second embodiment of the flow cell arrangement. In this particular embodiment a tube 100 is positioned within an evacuated chamber 101 having the inner walls thereof coated with a reflecting material 102. An inlet conduit 11' is in communication with one end of tube 100 and an outlet conduit 12' is in communication with the second end of tube 100. A first thermistor well 28' is mounted such that the tip thereof extends into conduit 11' and a second thermistor well 30' is positioned such that the tip thereof extends into conduit 12'. Conduit 11' has an orifice 103 positioned therein to direct the fluid flow past the tip of thermistor well 28' and conduit 12' has an orifice 104 contained therein to direct the fluid flow past the tip of thermistor well 30'. A heating coil 48' is spiraled about tube 100 and a heat insulation jacket 106 is disposed about coil 48'. If tube 100 is constructed of an electrically insulating material such as glass, coil 48' can be mounted directly thereon. If tube 100 is metallic a layer of electrical insulating material corresponding to layer 49 in Figure 2 must be positioned between tube 100 and coil 48'. The flow cell assembly illustrated in Figure 4 operates in the same manner as the cell illustrated in Figure 2. The embodiment of Figure 4 is useful for measuring small rates of flow and is primarily a laboratory device. The more rugged metal assembly shown in Figure 2 is employed in plant operations.

In view of the foregoing description it should be apparent that there is provided in accordance with this invention an improved thermal type flowmeter which is capable of measuring flow rates with a high degree of accuracy. This is accomplished by positioning a pair of sensitive thermistors in a flow path on opposite sides of a heating element. A modified form of Wheatstone bridge arrangement is utilized to detect the temperature differential. While this invention has been described in conjunction with present preferred embodiments thereof, it should be apparent that the invention is not limited thereto.

What is claimed is:

1. A flowmeter comprising, in combination, a conduit adapted to pass fluid, the flow rate of which is being measured, an electrical heating element enclosing a section of said conduit, heat insulating means enclosing said heating element, a first thermistor positioned within said conduit downstream from said heating element, a second thermistor positioned within said conduit upstream from said heating element, said thermistors being in direct thermal contact with the fluid passing through said conduit, and means to compare the resistances of said thermistors to provide an indication of the temperature difference between said thermistors, said temperature difference being a function of the flow through said conduit.

2. The combination in accordance with claim 1 wherein said comparing means comprises a Wheatstone bridge circuit having said thermistors connected in adjacent arms thereof.

3. The combination in accordance with claim 2 further comprising a source of direct voltage applied across a first pair of opposing terminals of said bridge circuit, a vibrating-reed converter connected between the second pair of opposing terminals of said bridge circuit to provide an alternating voltage representative of any electrical unbalance of said bridge circuit, and servomechanism responsive to said alternating voltage to vary the resistance of one element of said bridge circuit to restore electrical balance, the magnitude of variance of said one element needed to restore balance being a measurement of the difference in resistance of said thermistors.

4. A flowmeter comprising, in combination, an evacuated chamber, the inner walls of said chamber being formed of heat reflecting material, a first conduit extending through said chamber, an inlet conduit attached to one end of said first conduit, an outlet conduit attached to the second end of said first conduit, an electrical heating element enclosing a section of said first conduit to impart heat thereto, a body of solid heat insulating material enclosing said heating element, a first thermistor positioned within said inlet conduit, a first orifice positioned in said inlet conduit adjacent said first thermistor to direct the fluid flow through said inlet conduit past said first thermistor, a second thermistor positioned within said outlet conduit, a second orifice positioned in said outlet conduit adjacent said second thermistor to direct the fluid flow through said outlet conduit past said second thermistor, and means to compare the resistances of said thermistors to provide an indication of the temperature difference between said thermistors, said temperature difference being a function of the flow through said first conduit.

5. The combination in accordance with claim 4 wherein said comparing means comprises a Wheatstone bridge circuit having said thermistors connected in adjacent arms thereof, a source of direct voltage applied across a first pair of opposing terminals of said bridge circuit, a vibrating-reed converter connected between the second pair of opposing terminals of said bridge circuit to provide an alternating voltage representative of any electrical unbalance of said bridge circuit, and servomechanism responsive to said alternating voltage to oppositely vary the resistances of two elements of said bridge circuit to restore electrical balance, the magnitude of variance of said one element needed to restore balance being a measurement of the difference in resistance of said thermistors corresponding to the flow rate being measured.

6. A flowmeter comprising, in combination, an elongated chamber, a first conduit extending through said chamber, an inlet conduit attached to one end of said first conduit, an outlet conduit attached to the second end of said first conduit, a helical electrical heating element enclosing a section of said first conduit to impart heat thereto, a stationary rod positioned within said first conduit adjacent said heating element, said rod being provided with a spiral fin protruding therefrom whereby the fluid flowing past said rod follows a helical path thereby promoting efficient heat transfer from said heating element to said fluid, a body of heat insulating material enclosing said first conduit and substantially filling the interior of said chamber, a first thermistor positioned within said first conduit downstream from said heating element, a second thermistor positioned within said first conduit upstream from said heating element, said thermistors being in direct thermal contact with the fluid passing through said first conduit, and means to compare the resistances of said thermistors to provide an indication of the temperature difference between said thermistors, said temperature difference being a function of the flow through said first conduit.

7. The combination in accordance with claim 6 wherein said comparing means comprises a Wheatstone bridge circuit having said thermistors connected in adjacent arms thereof, a source of direct voltage applied across a first pair of opposing terminals of said bridge circuit, a vibrating-reed converter connected between the second pair of opposing terminals of said bridge circuit to provide an alternating voltage representative of any electrical unbalance of said bridge circuit, and servomechanism responsive to said alternating voltage to vary the resistance of one element of said bridge circuit to restore electrical balance, the magnitude of variance of said one element needed to restore balance being a measurement of the difference in resistance of said thermistors.

8. A flowmeter comprising, in combination, an elongated chamber, a first metallic conduit extending through said chamber, an inlet conduit attached to one end of said first conduit, an outlet conduit attached to the second end of said first conduit, a layer of electrically insulating material enclosing a section of said first conduit, an electrical heating element spiraled about said layer of insulating material, a body of solid heat insulating material enclosing said heating element and substantially filling the interior of said chamber, a first metallic well positioned within said first conduit downstream from said heating element, a second metallic well positioned within said first conduit upstream from said heating element, a first thermistor positioned within said first well, a second thermistor positioned within said second well, said thermistors being in direct thermal contact with the fluid passing through said first conduit, and means to compare the resistances of said thermistors to provide an indication of the temperature difference between said thermistors, said temperature difference being a function of the flow through said first conduit.

9. The combination in accordance with claim 8 wherein said comparing means comprises a Wheatstone bridge circuit having said thermistors connected in adjacent arms thereof, a source of direct voltage aplied across a first pair of opposing terminals of said bridge circuit, a vibrating-reed converter connected between the second pair of opposing terminals of said bridge circuit to provide an alternating voltage representative of any electrical unbalance of said bridge circuit, and servomechanism responsive to said alternating voltage to oppositely vary the resistances of two elements of said bridge circuit to restore electrical balance, the magnitude of variance of said one element needed to restore balance being a measurement of the difference in resistance of said thermistors.

10. A flow sensing element comprising a conduit adapted to pass fluid, the flow rate of which is to be measured, a heating element enclosing a section of said conduit, a mass of heat insulating material enclosing said heating element, a first thermistor positioned within said conduit downstream from said heating element, and a second thermistor positioned within said conduit upstream from said heating element, said thermistors being in direct thermal contact with the fluid passing through said conduit.

11. A flow sensing element comprising an evacuated chamber, the inner walls of said chamber being formed of heat reflecting material, a first conduit extending through said chamber, an inlet conduit attached to one end of said conduit, an outlet attached to the second end of said first conduit, an electrical heating element enclosing a section of said first conduit to impart heat thereto, a body of solid heat insulating material enclosing said heating element, a first thermistor positioned within said inlet conduit, a first orifice positioned in said inlet conduit adjacent said first thermistor to direct the fluid flow through said inlet conduit past said first thermistor, a second thermistor positioned within said outlet conduit, and a second orifice positioned in said outlet conduit adjacent said second thermistor to direct the fluid flow through said outlet conduit past said second thermistor.

12. A flow sensing element comprising an elongated chamber, a first conduit extending through said chamber, an inlet conduit attached to one end of said first conduit, an outlet conduit attached to the second end of said first conduit, a helical electrical heating element enclosing a section of said first conduit to impart heat thereto, a stationary rod positioned within said first conduit adjacent said heating element, said rod being provided with a spiral fin protruding therefrom so that fluid flowing past said rod follows a helical path thereby promoting efficient heat transfer from said heating element to said fluid, a body of heat insulting material enclosing said first conduit and substantially filling the interior of said chamber, a first thermistor positioned within said first conduit downstream from said heating element, and a second thermistor positioned within said first conduit upstream from said heating element, said thermistors being in direct thermal contact with the fluid passing through said first conduit.

13. A flow sensing element comprising an elongated chamber, a first metallic conduit extending through said chamber, an inlet conduit attached to one end of said first conduit, an outlet conduit attached to the second end of said first conduit, a layer of electrically insulating material enclosing a section of said first conduit, an electrical heating element spiraled about said layer of insulating material, a body of solid heat insulating material enclosing said heating element and substantially filling the interior of said chamber, a first metallic well positioned within said first conduit downstream from said heating element, a second metallic well positioned within said first conduit upstream from said heating element, a first thermistor positioned within said first well, and a second thermistor positioned within said second well, said thermistors being in direct thermal contact with the fluid passing through said first conduit.

References Cited in the file of this patent

UNITED STATES PATENTS

| | | |
|---|---|---|
| 1,281,051 | Mispel | Oct. 8, 1918 |
| 1,769,358 | Pinkerton et al. | July 1, 1930 |
| 2,038,511 | Kortlandt | Apr. 21, 1936 |
| 2,097,582 | Beyrodt | Nov. 2, 1937 |
| 2,509,889 | Shockley | May 30, 1950 |
| 2,552,017 | Schwartz et al. | May 8, 1951 |
| 2,586,060 | Kronberger | Feb. 19, 1952 |
| 2,615,959 | Spalding | Oct. 28, 1952 |
| 2,676,489 | Basham | Apr. 27, 1954 |
| 2,721,729 | Van Riper | Oct. 25, 1955 |
| 2,728,225 | Skibitzke | Dec. 27, 1955 |

FOREIGN PATENTS

| | | |
|---|---|---|
| 104,663 | Sweden | June 2, 1942 |

OTHER REFERENCES

Publication "Journal of Scientific Instruments," Institute of Physics, London, vol. 25, April 1948, page 137.

Publication "Electronic Industries," May 1943, pages 68, 69.